Aug. 27, 1968 T. E. CARRELL 3,399,302
GAMMA RADIATION SENSOR AND DETECTION SYSTEM
Filed June 19, 1964 12 Sheets-Sheet 1

INVENTOR.
TERRY E. CARRELL
BY
Charles F. Dischler
ATTORNEY

INVENTOR.
TERRY E. CARRELL
BY
Charles F. Dischler
ATTORNEY

Aug. 27, 1968  T. E. CARRELL  3,399,302
GAMMA RADIATION SENSOR AND DETECTION SYSTEM
Filed June 19, 1964  12 Sheets-Sheet 3

INVENTOR.
TERRY E. CARRELL
BY
Charles F. Dischler
ATTORNEY

Aug. 27, 1968 T. E. CARRELL 3,399,302
GAMMA RADIATION SENSOR AND DETECTION SYSTEM
Filed June 19, 1964 12 Sheets-Sheet 5

FIG. 12

INVENTOR.
TERRY E. CARRELL
BY
Charles F. Dischler
ATTORNEY

Aug. 27, 1968    T. E. CARRELL    3,399,302
GAMMA RADIATION SENSOR AND DETECTION SYSTEM
Filed June 19, 1964    12 Sheets-Sheet 6

INVENTOR.
TERRY E. CARRELL
BY
Charles F. Dischler
ATTORNEY

Aug. 27, 1968  T. E. CARRELL  3,399,302
GAMMA RADIATION SENSOR AND DETECTION SYSTEM
Filed June 19, 1964  12 Sheets-Sheet 7

INVENTOR.
TERRY E. CARRELL
BY
Charles F. Pinckler
ATTORNEY

Aug. 27, 1968 T. E. CARRELL 3,399,302
GAMMA RADIATION SENSOR AND DETECTION SYSTEM
Filed June 19, 1964 12 Sheets-Sheet 9

INVENTOR.
TERRY E. CARRELL
BY
Charles F. Dischler
ATTORNEY

Aug. 27, 1968 T. E. CARRELL 3,399,302
GAMMA RADIATION SENSOR AND DETECTION SYSTEM
Filed June 19, 1964 12 Sheets-Sheet 10

INVENTOR.
TERRY E. CARRELL
BY
Charles F. Dischler
ATTORNEY

Aug. 27, 1968  T. E. CARRELL  3,399,302
GAMMA RADIATION SENSOR AND DETECTION SYSTEM
Filed June 19, 1964  12 Sheets-Sheet 11

FIG. 20

INVENTOR.
TERRY E. CARRELL
BY
Charles F. Dischler
ATTORNEY

United States Patent Office 3,399,302
Patented Aug. 27, 1968

3,399,302
GAMMA RADIATION SENSOR AND
DETECTION SYSTEM
Terry E. Carrell, Los Angeles, Calif., assignor to North
American Rockwell Corporation, a corporation of
Delaware
Filed June 19, 1964, Ser. No. 377,179
11 Claims. (Cl. 250—71.5)

The present invention is directed to nuclear radiation detectors and more particularly to gamma ray detectors for detecting the presence of fissionable materials over long distances.

The present invention is primarily directed to providing a system capable of detecting the presence of undetonated nuclear weapons. Previously proposed systems for meeting this urgent need have been unsuccessful because (1) of the high background counting rate inherent in such systems and resulting small range and lack of ability to distinguish between different nuclear radiations, as well as radiations of different energies, and (2) the problem of atmospheric absorption of radiation emanating from undetonated weapons and resulting loss of intensity and the lack of definition of the energy characteristics of the source to be detected. The present invention may also be utilized to detect and locate facilities and devices utilizing fissionable materials; products resulting from the utilization of fissionable materials; radioactive materials generally which emit penetrating radiation of the gamma ray or neutron type.

Prior art gamma ray detection systems have not successfully met three basic criteria for the detection of gamra rays over long distances. These three criteria are: (1) discrimination of gamma rays from all other radiation; (2) suppression of all radiation including gamma rays which do not arrive from a predetermined direction; and (3) detection of only gamma rays having an energy level characteristic of the source to be detected.

It is, therefore, the fundamental purpose of the present invention to provide a radiation detection system which fulfills these basic criteria and which can be utilized for any one or all of the following purposes: detection and identification of undetonated nuclear weapons, airborne inspection, nuclear build-up vertification, nuclear weapons monitoring, antisubmarine warfare, satellite inspection, and ICBM Decoy Discrimination, and other similar detection applications.

It is, therefore, the object of the present invention to provide a nuclear radiation detection system which has a low background counting rate.

It is a further object of the present invention to provide a nuclear radiation detection system which is particularly adaptable for detecting radiation which interacts with matter but which is difficult to stop, i.e., neutrons and gamma rays, by the use of automatic discrimination thereby materially reducing and essentially eliminating heavy radiation shields.

It is another object of the present invention to provide a gamma ray detection system which is directionally discriminating and in which the signal to noise ratio is significantly increased by providing background suppression thereby increasing detection range.

It is a still further object of the present invention to provide a gamma ray detection system which discriminates against gamma ray energies not of the energy level emitted by a pre-selected gamma source to be detected.

It is another object of the present invention to provide a sensor unit adaptable for use with a variety of radiation types which provides for selective discrimination as to direction and radiation type.

It is another object of the present invention to provide a gamma ray detecting system in which a gamma ray sensor in combination with a discriminating system suppressed background noise so that gamma ray sources at large distances may be detected.

A still further object of the present invention is to provide a detection and identifying system in which a radiation source may be identified by detecting gamma rays emitted by the source and comparing the characteristics of the source with known characteristics to establish the nature of the source.

These and other objects of the present invention will be more apparent from the following detailed description and drawings, hereby made a part of the specification, in which:

Figure 1:
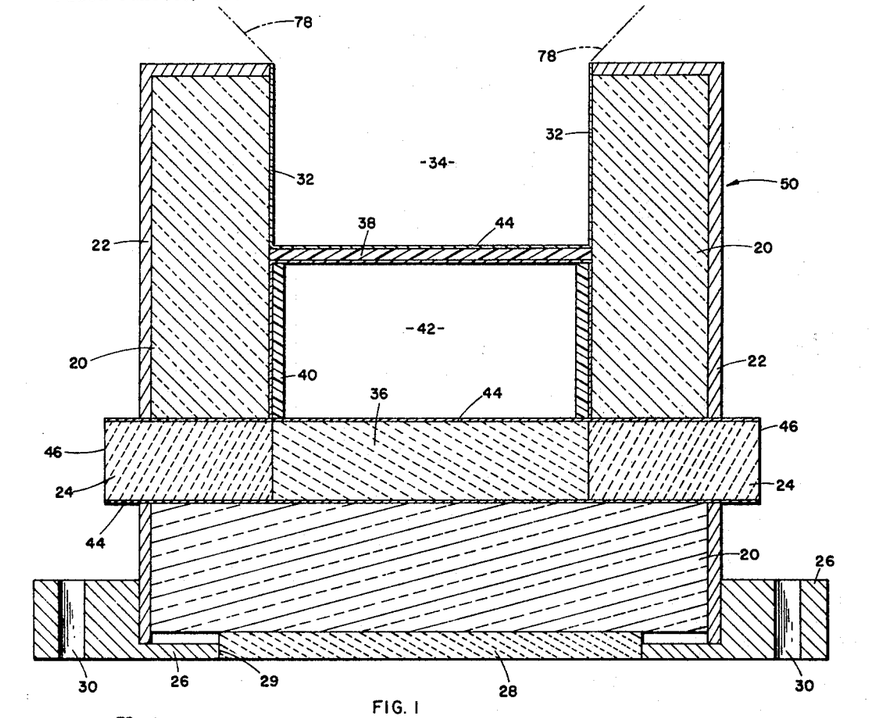
FIG. 1 is a partially sectioned view of the detector of the present invention.

The present invention comprises a radiation sensor subsystem and an electronic subsystem which cooperate in combination to provide a nuclear radiation detector system. The radiation sensor system is shown in FIG. 1 and comprises an inner scintillator component and an outer scintillator component. The outer crystal component 20 of the preferred embodiment is a standard 5″ diameter x 5″ high well-type NaI (Tl) scintillator mounted in a copper case 22 having two diametrically opposed openings in which light transmitting members, e.g., quartz light pipes 24, are mounted. The case 22 is attached to a base plate 26 having a Vycor window 28 sealed in aperture 29 to which the outer crystal component 20 is optically coupled. Base plate 26 is provided with means 30 for efficiently coupling to the scintillation crystal 20 a standard photomultiplier tube. The inner walls 32 of crystal 20 are covered with 5-mil aluminum. The aluminum lined crystal 20 may also utilize a 1/8" thick packed magnesium oxide reflector (not shown) on its surfaces if desired. The 3" x 4" lined well indicated generally at 34 contains the inner scintillator component consisting of a 3" diameter x 3/4" high NaI (Tl) scintillation crystal 36 and a 3" diameter x 1/8" thick scintillating plastic disc 38 separated by a plastic tube 40 which in combination form a sealed chamber 42. Both the plastic disc 38 and crystal 36 are covered by a 5-mil aluminum foil reflector 44 and are joined by epoxy resins in an assembly. The sealed chamber 42 is filled with dry nitrogen gas at or near ambient temperature.

The inner surfaces of light pipes 24 are optically coupled to crystal 36, while scintillation disc 38 is optically coupled to scintillation crystal 20 along its circumference. Crystal 36 and associated light transmitting members 24 are completely enclosed in an aluminum or other opaque or reflector coating so that the outer surfaces 46 of members 24 transmit only light collected from crystal 36. A photomultiplier is optically coupled to each of the surfaces 46. Window 28 which is optically coupled to crystal 20 and plastic 38 forms a second optical system completely decoupled from the first optical system associated with crystal 36.

The outer detector 20 may be plastic, crystal, glass or a liquid scintillator. The inner detector 36 may also be of any of their various forms.

The sensor of FIG. 1 may also be modified to allow low background detection of neutrons or charged particles (e.g., alpha or beta particles). Detection of neutrons may be accomplished by using neutron sensitive scinitillators e.g., europium activated lithium iodide in place of 36 and cerium activated glass for outer detector 20. In such a modification the energy of reaction is sufficiently great to allow effective electronic discrimination Since almost all charged particles can be stopped by placing a thin scintillation crystal wafer 38 in front of the neutron sensitive scintillator, an efficient neutron detector can be fabricated by replacing the usual liquid or plastic plug 38 with a thin gamma ray sensitive crystal and using a neutron sensitive scintillator as the inner detector 36 The outer detector 20 of such a sensor could utilize a thick liquid, glass or plastic scintillator shield.

By utilizing the above described sensor, there is no need for radiation shielding to eliminate unwanted radiation. In this manner the following advantages are present: Bremsstrahlung arising from reactions in the shielding are eliminated; cosmic radiation could not be stopped by the shielding and therefore could not be discriminated against, whereas in the above described sensor such discrimination is attained; the inclusion of radioactive elements in lead shielding or other non-scintillating substance would not be self-cancelling, whereas in the present sensor such radiation is detected in both inner and outer detectors; gamma ray scattering by the lead shield could result in lowering of the energy and detection thereby giving a false indication. Thus, the sensor provides for automatic discrimination without the necessity for heavy shielding thereby facilitating the portability of the system.

The preferred embodiment, shown in FIG. 1, however, is particularly arranged for detecting gamma rays and the use of the detector in combination with associated electronics will now be described in detail.

Figure 2:
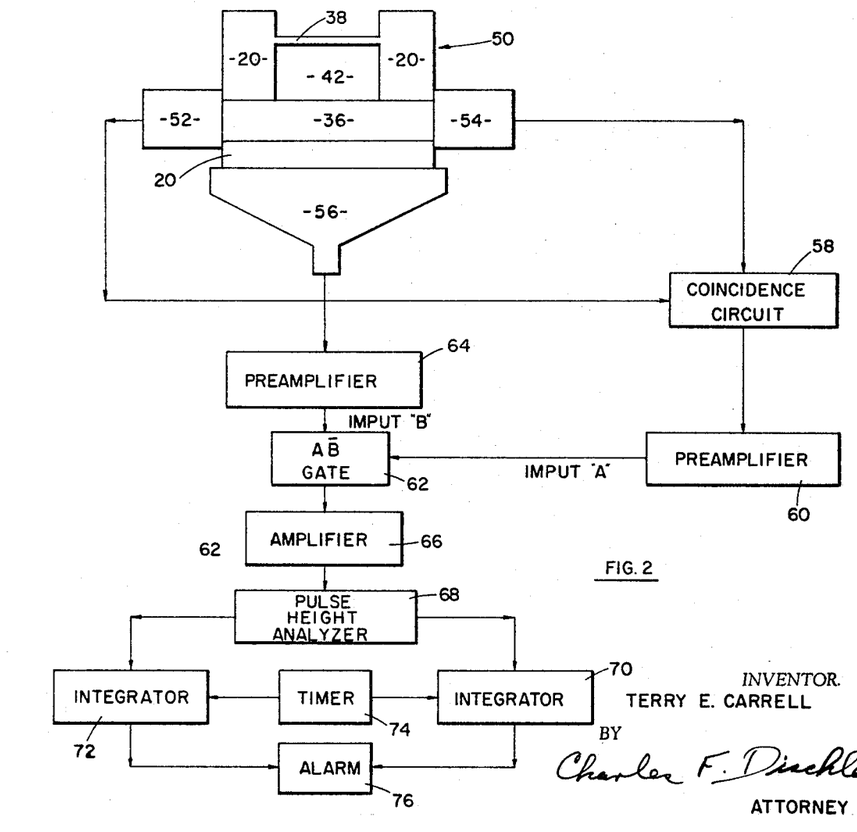
FIG. 2 is a schematic diagram of one embodiment of the present invention.
Figure 3:
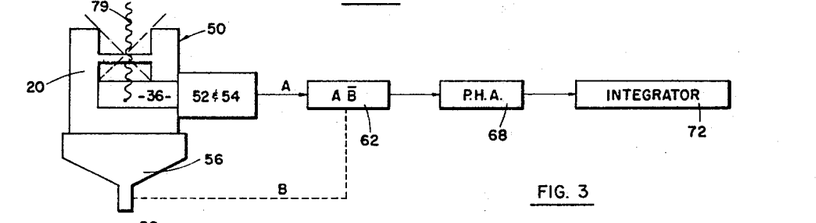
FIGS. 3–8 show schematically the operation of the system of the present invention with various nuclear radiations of various energies arriving from various directions.

The system of the first embodiment is shown schematically in FIG. 2. The embodiment of FIG. 2 includes a sensor unit, shown in detail in FIG. 1, and indicated generally at 50 in FIG. 2, to which photomultipliers 52, 54, and 56 are optically coupled as noted above. Photomultipliers 52 and 54 are connected through a coincident circuit 58 and preamplifier 60 to one input of gate 62. The output of photomultiplier 56 is connected through preamplifier 64 to the second input gate 62. The output of gate 62 is connected through amplifier 66 to pulse height analyzer 68 which has two outputs each connected to one integrator 70 and 72. The integrators 70 and 72 are controlled by a timer 74 and provide output signals to alarm 76.

The operation of the embodiment of FIG. 2 will be more apparent from FIGS. 3–8 hereof. The gamma ray sensor shown in FIG. 1 comprises three coaxial cylindrical scintillators which emit light when struck by radiation. Their response characteristics and geometrical arrangement are such that only gamma rays arriving within the sensor field of view 78 are sent on to the logic circuitry. Both inner scintillator 36 and outer scintillator 20 are sensitive to gamma rays and charged particles, while the plastic scintillator 38 is essentially sensitive to only charged particles. The plastic scintillator 38 is used to prevent unwanted charged particles from striking the inner scintillator 36. The outer scintillator 20 is used to eliminate all gamma rays and charged particles not arriving at the inner scintillator from the cone 78 (see FIG. 1) defining the field of view. This cone may be selected as desired with an included angle of preferably from about 1° to about 10°. By narrowing the field of view, i.e., reducing the angle, and eliminating the charged particles, the background radiation may be processed and through the logic circuitry substantially reduced.

The basic function of the scintillators is to convert incoming nuclear radiation into pulses of light which can be detected by photomultipliers viewing the various scintilators. These photomultipliers are optically coupled to the scintillators by light pipes, optical window, etc., to form the two optical systems described above with respect to FIG. 1. Upon detection by photomultipliers 52, 54, and 56 these light pulses are converted to electric pulses, amplified, and sent to the logic circuits as noted above. By using an "A not B" gate 62 all gamma rays arriving from outside the viewing angle can be discriminated against by rejecting all light pulses appearing only in the outer detector 20 (the combination of the outer crystal or glass scintillator 20 and the plastic scintillator 38 is referred to herein as outer detector 20), or in both the inner (plastic scintillator 36) and outer detectors. If only those scintillations occurring first in the inner detector 36 are accepted, all charged particle pulses and all extraneous gamma ray pulses are eliminated, reducing the nuclear background noise significantly.

The output of gate 62 will consist entirely of photomultiplier tube pulses generated by gamma rays entering the sensor within the view of cone 78. To further reduce the effect of background any pulse passed by gate 62 is first amplified by 66 and then fed to pulse height analyzer 68 to accurately determine the energy level of the gamma ray which caused the scintillation. Only those gamma rays having the same energy as those emitted by a characteristic source which is to be detected, i.e., plutonium or fissionable uranium in this embodiment, will be registered by the analyzer 68 as useful counts.

To insure that any increase in counting rate displayed by the detectors is really due to the presence of fissionable uranium or plutonium, and not by random fluctuations in background, integrator circuits 70 and 72, respectively, are included in each output which integrates the output of analyzer 68 for a preselected time, preferably a period of several seconds. An alarm circuit 76 then compares this integrated output with a predetermined threshold and, if the counting rate is greater than threshold, sounds an alarm indicating that a source of predetermined characteristic radiation, i.e., plutonium or fissionable uranium in a nuclear weapon, is in the field of view.

FIGS. 3–8 schematically illustrate in greatly simplified form the operation of the detecting system of the present invention when a source, e.g., plutonium, is within its field of view. For simplicity, some of the electronic components are not illustrated in FIGS. 3–8. Further, energized electrical connections are shown as solid lines between components, while unenergized electrical connections are shown as dashed lines for ease of illustration and explanation. Gamma rays, shown as a waved line 79, from the plutonium source arrive within the cone of view 78, pass easily through the aluminum foils 44 and the thin plastic scintillator 38, and scintillate first in the inner crystal 36. The light from the scintillation pulse is transmitted through light conducting members 24 (see FIG. 1), detected by the photomulipliers 52 and 54 and, since there is an input pulse through coincidence circuit 58 to input A but not from B representing scintillations in 20, the pulse is passed through the linear logic gate 62, amplifier 66 to the pulse height analyzer 68. The pulse height analyzer 68 determines the energy of the detected gamma ray 79 and compares this with a predetermined gamma ray energy of a preselected source to be detected, e.g., the gamma ray energy which would be expected from a plutonium source. If the two energies are identical, as they will be in this case, the pulse height analyzer 68 will transmit the pulse to the integrator 72 for plutonium and alarm circuits 76 for final processing (see FIG. 2).

Figure 4:
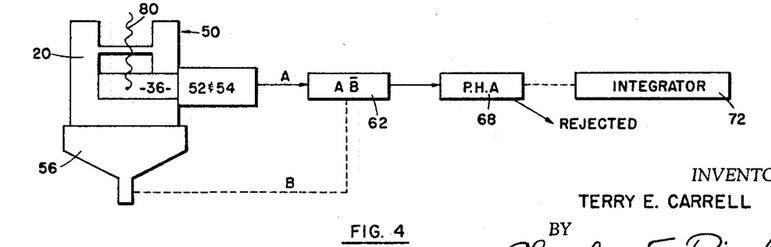
Figure 5:
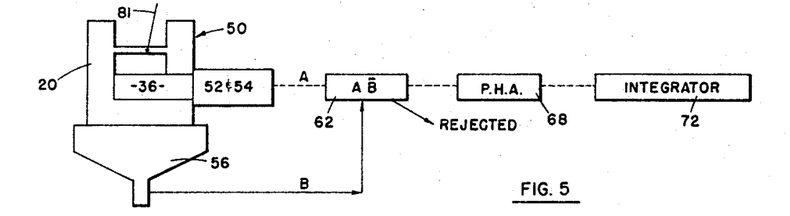
Figure 6:
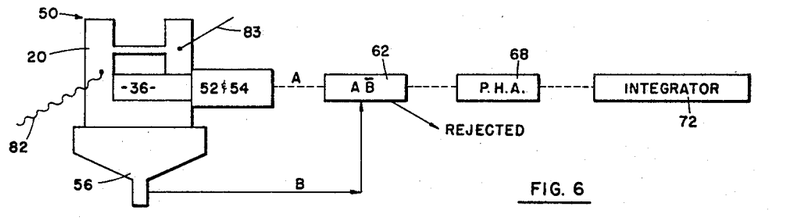
Figure 7:
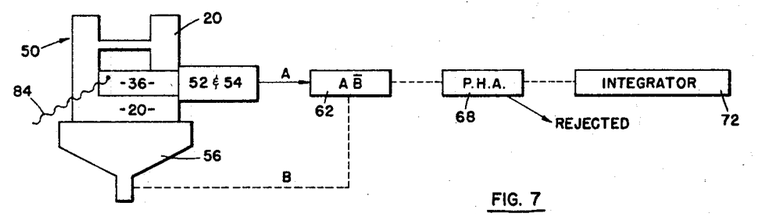
Figure 8:
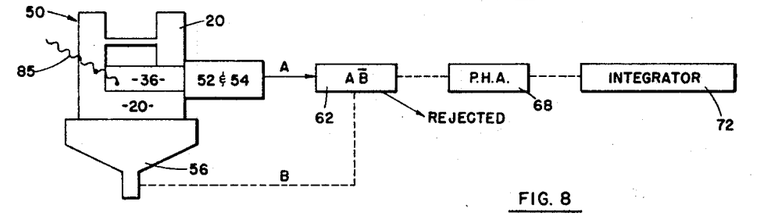

Some of the techniques used by the system to reject extraneous pulses (and thus lower the background counting rate of the system) are shown in FIGS. 4, 5 and 6. FIG. 4 illustrates the capability of the system to reject all extraneous gamma rays 80 even though they arrive within the viewing angle. When the energy of the incoming gamma ray 80 is not within an energy range corresponding to the energy of a plutonium gamma ray which is to be detected and located, it is rejected as noise (i.e., not passed to subsequent circuits) by the pulse height analyzer 68. Similarly, a charged particle 81 (see FIG. 5) entering within the cone of view 78 will scintillate first in the plastic scintillator 38. Since the plastic is optically coupled to the outer crystal or glass scintillator 20 and hence to the large photomultiplier 56, the scintillation will be detected and fed through preamplifier 64 into the logic circuit as "input B." Since this pulse does not satisfy the "A, not B" requirement for gate 62, it is rejected as noise. A third method of noise suppression is shown in FIG. 6. Either gamma rays 82 or charged particles 83 which strike the scintillator 20 from outside the cone of view 78 will scintillate first in the outer detector 20 unless they have extremely high energies. As was shown in FIG. 5, any scintillation arising in the outer scintillator 20 will cause a B input to the logic gate 62, causing the signal to be rejected as noise. In the case of very high gamma rays or cosmic rays, two different types of interaction are possible: (1) the gamma ray or cosmic ray 84 will pass through the outer scintillator undetected and then be detected by the inner scintillator 36 (FIG. 7), or (2) the gamma ray 85 may cause scintillations in both the inner and outer scintillators (FIG. 8) and may terminate in inner detector 36 or pass entirely through the sensor. In the case shown in FIG. 7, the pulse from photomultiplier 54 will pass through the logic gate 62 without difficulty but will be rejected by the pulse height analyzer 68 because of the very high energy of the pulse detected. When the gamma ray or cosmic ray 85 causes scintillations in both the inner 36 and outer detectors 20 (FIG. 8), the pulses generated cause inputs at both A and B, with a consequent rejection of the pulses by the logic gate 62. This same process, incidentally, eliminates the possibility of detecting a false signal caused by the bremsstrahlung radiation (X-ray energy emitted when a beta particle is suddenly stopped) caused by beta particle capture in the plastic scintillator 38. As a result of the unique noise suppression capabilities of the system, the background counting rate is several orders of magnitude lower than those of the prior art.

The sensitivity and dark current characteristics of the photomultiplier tubes are selected to provide high performance in accordance with techniques well known in the art. Photomultipliers 52 and 54 were type 9524A having a dark current of about 1 m$\mu$a. at about 1000 v. o/A while photomultiplier 56 was a 9530B type having a dark current of about 85 m$\mu$a. and about 1600 v. o/A. The output of photomultiplier 56 was taken directly from the anode while the output of the pair of photomultipliers optically coupled to the inner optic system of scintillator 36 was taken from both the last dynode and from the anode to supply two signals of opposite polarity for the inner detector coincident gate 58.

The coincidence gate 58 functions to generate an output pulse only if there are simultaneous pulses at the output of both inner detector photomultipliers 52 and 54. The circuit of gate 58 is shown in detail in FIG. 9. Inputs 86 and 88 are connected to the last dynodes of photomultiplier 52 and 54, respectively, while the collectors of photomultipliers 52 and 54 are connected together to the third input 90. The coincidence gate 58 functions as follows: If a pulse occurs only at one photomultiplier the dynode and collector pulse will cancel each other because they are of opposite polarity and equal magnitude. When pulses occur simultaneously at both photomultipliers 52 and 54 they cancel only partially because of the nonlinearity of diode response. Thus, the gate 58 passes a pulse to output 92 if, and only if, pulses arise on both inner detector photomultipliers 52 and 54 at the same time. This feature provides a substantial reduction in background noise by effectively cancelling almost all photomultiplier tube noise while allowing true scintillation signals to pass.

Figure 10:
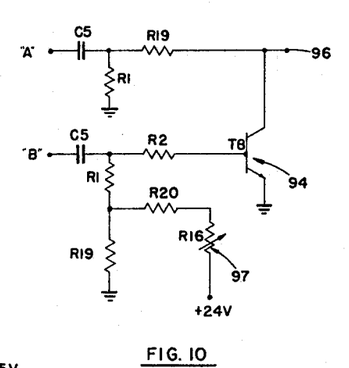
FIG. 10 is a circuit diagram of the $A\overline{B}$ logic gate of the system of FIG. 2.

After passing through coincidence gate 58, the pulses are amplified to a value 3 times their original value by preamplifier 60 which is a standard Linear Pulse Preamplifier. The output of preamplifier 60 is supplied to logic gate 62 as input A thereof. Similarly, light pulses arising in the outer detector 20 are transformed into electrical pulses by photomultiplier 56, the output of which is amplified by preamplifier 64 to ten times its original value and supplied to logic gate 62 as input B thereof. The detail arrangement of logic gate 62 is shown in FIG. 10. Normally the transistor 94 is cut off and all pulses from the inner detector coincidence gate 58 and associated preamplifier 60, i.e., input A, are passed to the output 96. Pulses from the outer detector photomultiplier 56 and associated preamplifier 64, i.e., input B, drive transistor 94 into saturation and prevent all pulses from the inner detector coincidence gate 58 from being transmitted to output 96. The bias on transistor 94 is adjustable by use of variable resistance 97, thereby allowing the inhibiting action of this gate to be optimized for the particular gamma ray energy of interest.

Inner detector pulses successfully passing through the "A, not B" gate 62 without being inhibited by a simultaneous pulse from the outer detector through photomultiplier 56, are then passed through amplifier 66 to insure proper pulse shape and linearity and are amplified to a value several thousand times their original value before being passed to the dual channel pulse height analyzer 68. Analyzer 68 compares the height of the input pulse with the pulse height which would be generated by the scintillation resulting from a preselected gamma ray, e.g., a gamma ray emitted by plutonium. If the incoming pulse has the proper height, it is reshaped into a square wave and used to drive the scaler of integration circuit 72. Upon receipt of an "interrogate" pulse from timer 74, as explained in detail hereinafter, the scaler is actuated for a predetermined variable length of time, the integration period. The number of pulses counted on the scaler, when compared to the normal background counting rate, is used to determine whether or not plutonium is within the field of view. This comparison may be made by hand or by a standard difference circuit where the background counting rate is stored and subtracted from the pulse counted during the interrogation count. This arrangement is well known in the art and is therefore not described herein in detail.

Figure 11:
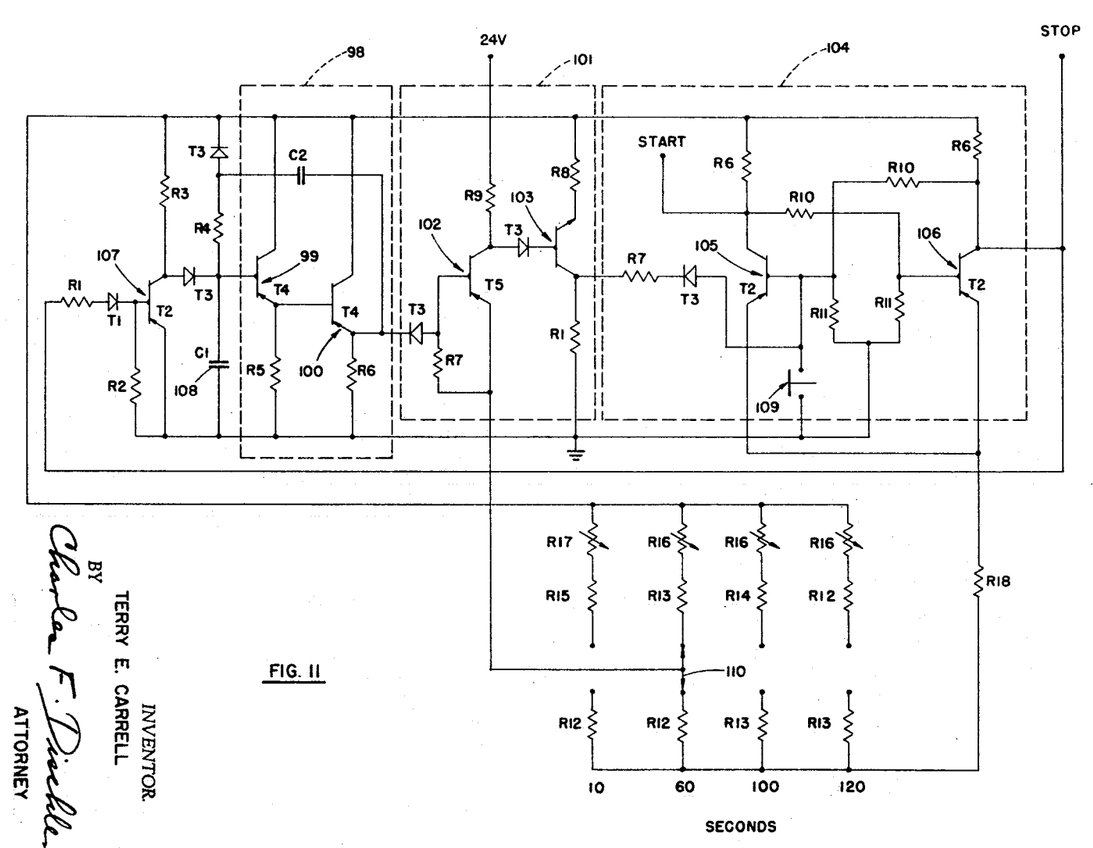
FIG. 11 is a detailed circuit diagram of the timer circuit of the system of FIG. 2.

The timer circuit is shown in detail in FIG. 11 and consists of four cooperating circuits. The bootstrap circuit 98, having transistors 99 and 100, provides the time base for the timer. The voltage comparator 101, having transistors 102 and 103, controls the length of the timing cycle by controlling the emitter voltage of transistor 102. The flip-flop circuit 104 consists of transistors 105 and 106. Normally, 106 is cut off, keeping transistor 107 saturated and the timing capacitor 108 discharged. The pushbutton "interrogate" switch 109 starts the timing cycle by turning on transistors 105 and 106 and turning transistor 107 off. The flip-flop circuit 104 is reset by voltage comparator circuit 101 when the base voltage of transistor 103 exceeds the emitter voltages automatically turning off the integrators 70 or 72.

The length of the timing cycle is controlled by multiposition switch 110 connecting the voltage source through different resistance circuits to the emitter of transistors 102 and 106.

Figure 9:
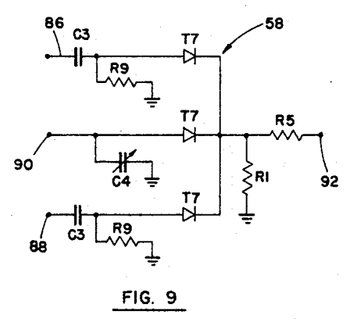
FIG. 9 is a circuit diagram of the coincidence gate of the system of FIG. 2.

The above described embodiment of the present invention while providing a simple, relatively inexpensive, electronic subsystem for use with the sensor system of FIG. 1 has the disadvantage that it must operate at relatively low-voltage levels because of the low-level output of the diode coincidence gate of FIG. 9. Since the pulse height at output 92 of this gate is proportional to the difference between the diodes' output with a voltage of $2V_0$ imposed and twice the output caused by a voltage $V_0$ impressed upon them, the difference between the two is quite small due to the small nonlinearity factor of the gate. Further, in this subsystem upon receiving an inhibit pulse from the outer scintillator, the gating transistor 94 (see FIG. 10) is driven to saturation. This results in passage of low-level signals. Since the output signals from the gate of FIG. 9 are also low-level the logic gate of FIG. 10 is not as effective as might be desired. These inefficiencies coupled with incomplete noise cancellation result in decreased range of detection and require longer interrogation times to detect and identify particular source. To alleviate these problems, the electronic subsystem shown in FIGS. 12–15 may be utilized with the sensor of FIG. 1 for faster identification and increased range of detection. The system, illustrated schematically in FIG. 12, shows the second embodiment of the electronic subsystem and its interrelation with the sensor of FIG. 1.

Figure 12:
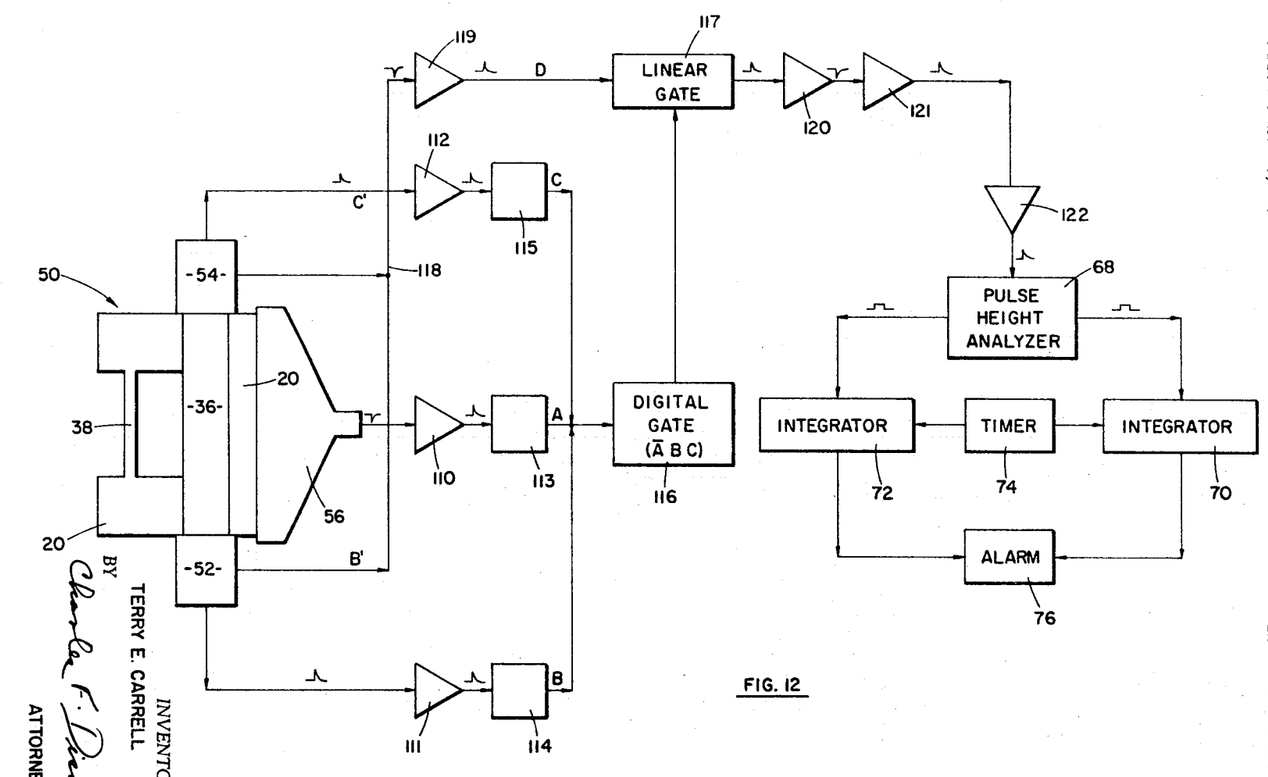
FIG. 12 is a schematic diagram of a second embodiment of the present invention.
Figure 12A:
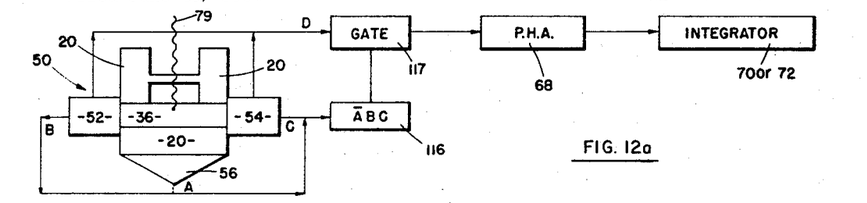
FIGS. 12A through 12D show schematically the operation of the embodiment of FIG. 12 in response to various radiations.

The sensor unit 50 shown in FIG. 12 is the same as that shown in FIG. 1, i.e., a pair of optical paths 20 and 36 each constituting a scintillator are coupled to their respective photomultiplier tubes 56 and 52, 54. In this embodiment the anode of photomultiplier 56 is connected through a preamplifier 110, where the pulse is amplified by a factor of ten and passed through a monostable multivibrator 113 utilized here as a pulse shaping circuit. The final dynodes of photomultipliers 52 and 54 are also connected through preamplifiers 111 and 112 respectively, and passed through associated monostable multivibrator pulse shaping circuits 114 and 115, respectively, to digital gate 116. The output of digital gate 116 is connected to one input of linear gate 117.

The anodes of each of the photomultipliers 52 and 54 are connected to the common input 118 of preamplifier 119, where the pulse is amplified by a factor of three, and passed to the second input of linear gate 117. The output of gate 117 is passed through a pair of inverting preamplifiers 120 and 121 with a gain of one, to the input of linear amplifier 122. The output of amplifier 122 is connected to a pulse height analyzer 68, the remaining components and connections being the same as described with respect to FIG. 2.

In operation, if pulses appear at the outputs A, B, and C of multivibrators 113, 114, and 115, respectively, i.e., a light pulse has taken place within both optical systems, the digital gate 116 does not generate an output to gate 117. The gate 116 requires that output pulses be present on inputs B and C but not on input A, i.e., that the event giving rise to the scintillation detected take place in the inner optic system 36 only, before an output signal is generated by gate 116.

Figure 13:
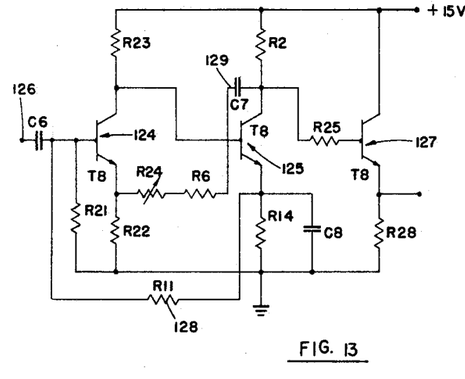
FIG. 13 is a circuit diagram of the preamplifier used in the embodiment of FIG. 12.

Preamplifiers 110, 111, and 112 having a gain of 10 are shown in detail in FIG. 13. These preamplifiers consist of two direct-coupled transistors 124 and 125 having a grounded emitter to amplify the signal from input 126 and a single emitter follower stage 127 to match the preamplifier output impedance to the input impedance monostable oscillator 113–115. Circuit stabilization is provided by the negative feedback resistor 128 from the emitter of the transistor 125 to the base of the transistor 124 and by the feedback loop 129 from the collector of transistor 125 to the emitter of transistor 124. Since the pulses from this circuit are converted in the monostable oscillators 113–115 into digital signals virtually without regard to the original height of the incoming pulse, preamplifier linearity is not essential.

After being amplified by the preamplifiers 110–112 of FIG. 13, the pulses from the dynodes of the three photomultipliers 52, 54, and 56 are capacitively coupled through diode 130 (see FIG. 14) to remove any spurious transients on the pulse into the monostable multivibrator. This multivibrator, shown in FIG. 14, consisted of two transistors 131 and 132 and their associated components. In the normal (or relaxed) condition transistor 132 is biased into saturation while transistor 131 is cut off. Upon receipt of the positive pulse on input 133 from the preamplifier, e.g., 110, this situation is reversed since the pulse turns transistor 131 on, lowering the collector voltage and consequently discharging the capacitor 134 coupling the two transistors. The negative pulse induced by this discharge turns transistor 131 off, raising its collector voltage and charging capacitor 135 in the R-C feedback network, and holding transistor 131 on until the charge had dissipated. At this time the situation is rapidly reversed again, turning transistor 131 off, turning the 132 on, returning the multivibrator to its original state.

Figure 14:
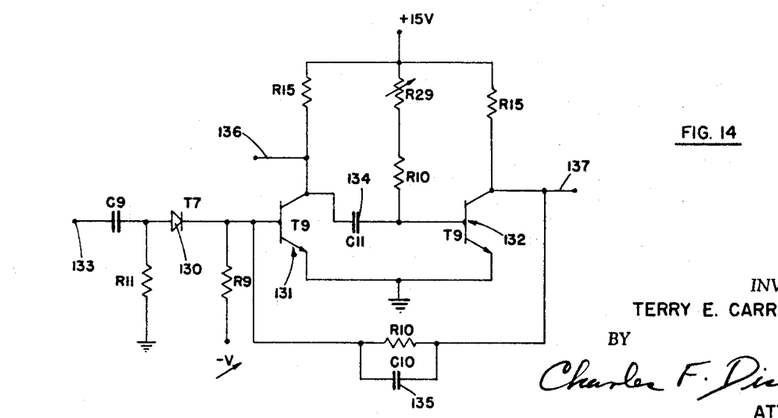
FIG. 14 is a circuit diagram of the multivibrator used in the embodiment of FIG. 12.

The output signal at 136 from the monostable multivibrators 113–115 consists of a negative square wave generated at the collector of transistor 131, while the output signal at 137 is a positive square wave at the collector of transistor 132. In the case of monostable multivibrator 113 the negative output 136 is tied to the logic gate 116, shown in FIG. 15, while in the case of monostable multivibrators 114 and 115 the positive output 137 is used. The input diode logic gate, see FIG. 15, consists of three diodes 138 connected in parallel and tied to a +15 volt voltage source through resistor 139 so that a voltage can exist at the junction 140 of the three diodes 138 and the resistor 139 only when there are positive pulses received from the B and C channels, i.e., multivibrators 114 and 115, but none from the A channel multivibrator 113. In any other situation the point 140 is at ground potential. For example, if all three monostable multivibrators 113–115 have been triggered by incoming pulses, since transistor 132 to which this terminal is connected will be in the saturated condition when the pulse is received, the terminal 140 will be effectively grounded, grounding the junction 140 of the diodes 138 and the resistor 139. Similarly, if either of the B or C channels from multivibrators 114 and 115 are not triggered when there is no pulse from 113, the junction 140 will still be grounded due to the fact that the output 137 of 113 will be connected to a transistor 132 in the saturated mode, resulting in only a few ohms resistance between the terminal 137 and ground. The only time that the diode-resistor junction 140 is not grounded is when both 114 and 115 are triggered simultaneously and there is no signal present in the A channel from 113. Because of the requirement that B and C both fire simultaneously, only pulses which arise in both photomultipliers 52 and 54 can meet this requirement. True scintillations in the detector will meet this requirement, but noise pulses arising in the photomultipliers and their associated amplifiers will not, to greatly reduce the electronic background noise of the system. The requirement that there must not be a pulse in the A channel when there is one in the B and C channel enables this circuit to perform the same function as the anticoincidence circuit 58 used in the embodiment of FIG. 2 eliminating pulses which either arise only from the outer detector 20 or which arise in both the inner 36 and outer 20 detectors.

Figure 15:
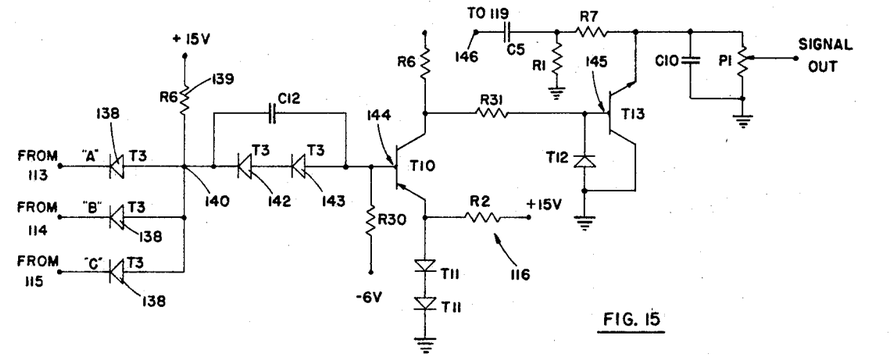
FIG. 15 is a circuit diagram of the logic gate used in the embodiment of FIG. 12.

If the "B and C, but not A" logic requirement is met the junction 140 of the three diodes and the resistor 139 is at a potential of approximately 15 volts with respect to ground, causing a current flow through the coupling pulse shaping diodes 142 and 143 and turning off transistor 144, which, in turn, turns off the linear gate transistor 145. In the normal mode of operation, the transistor 145 is in the saturated mode, thereby effectively grounding the signal line 146 connected to the output of preamplifier 119. In this manner it is impossible for signals to be passed from the linear preamplifier 119 to the linear amplifier 120 and pulse height analysis circuits 68. Only when transistor 145 is turned off can signals pass through the gate 117 due to the great difference between the saturated and unsaturated resistance of this transistor.

As shown in FIG. 12 the signal channel is similar to that used in embodiment of FIG. 2. After being taken from the signal photomultipliers 52 and 54 are summed, pulses arising in these two photomultipliers are amplified by preamplifier 119 by a factor of approximately 3 and then passed to the linear gate 117. If the requirement for signals from both the B and C channels but not from the A channel has been satisfied, 117 will be open and the signal will pass through two preamplifiers 120 and 121; to both match the input impedance of the linear amplifier 122 and obtain the correct signal polarity. After being further amplified by linear amplifier 122, it is passed to pulse height analyzer 68 and into the integrators 70 or 71 in a manner similar to the embodiment of FIG. 2.

FIGS. 12A through 12D schemactically illustrate in greatly simplified form the operation of the system of FIG. 12 when a source to be detected is within the field of view of the sensor 50. For simplicity some of the electronic circuits are not shown. Energized electrical connections are shown as solid lines between components, while unenergized electrical connections are shown as dashed lines for ease of explanation. Gamma rays, shown as 79, of the right energy and direction, i.e., coming from a plutonium, uranium, or other source to be detected pass easily through foils 44 and scintillator 38 and scintillate first in the inner crystal 36. The light from the scintillator pulse is transmitted through light conducting member 24 (see FIG. 1), detected by photomultipliers 52 and 54 and, since there is no output from photomultiplier 56 responding to outer detector 20 the $\overline{A}BC$ gate 116 is energized and an output signal delivered to gate 117. With an output from gate 116 and on lead D gate 117 passes a signal to pulse height analyzer 68. Since the incoming gamma ray 79 was of the correct energy pulse height analyzer 68 energizes the appropriate integrator 70 or 72, e.g., for detecting uranium or plutonium source.

Figure 12B:
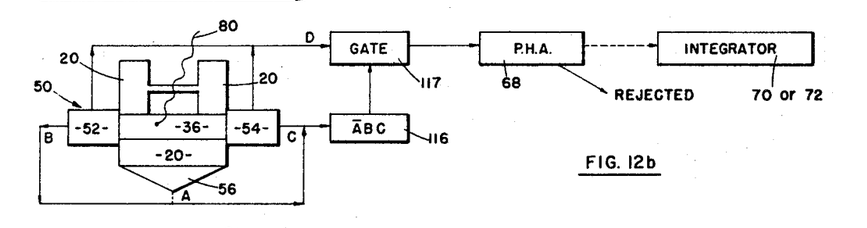

If the incoming gamma ray were not from an appropriate preselected source type, i.e., 80 in FIG. 12B, the operation would be the same except that the pulse height analyzer 68 would not energize the integrator unless the pulse from 117 representing the gamma ray 80 is of a preselected energy value. Thus, in FIG. 12B the gamma ray 80 is rejected, i.e., discriminated against by having an energy not falling within the preselected range.

Figure 12C:
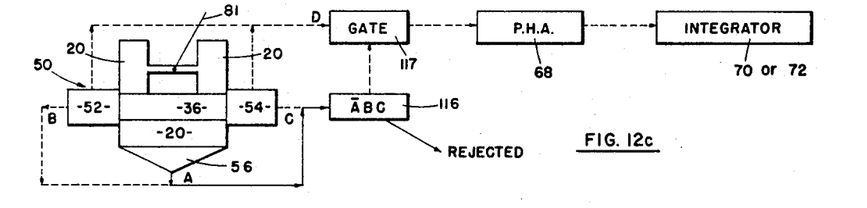

FIG. 12C shows the detection of a charged particle 81 which will scintillate in plastic disc 38, being optically coupled to outer detector 20. Thus, photomultiplier 56 will be energized but neither gate 117 nor gate 116 will generate a signal since there is no output at D from photomultipliers 52 and 54 and the logic condition for gate 116, i.e., $\overline{A}BC$ has not been fulfilled. Thus, this radiation is effectively rejected by gate 116.

Figure 12D:
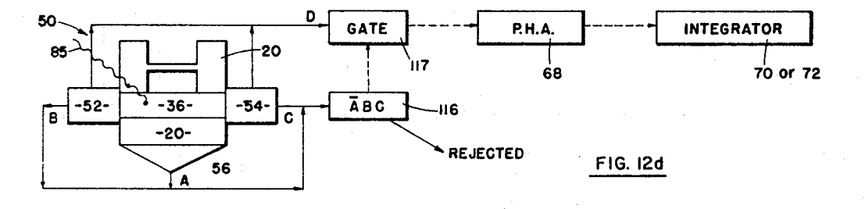

FIG. 12D shows an incoming gamma ray 85 which causes scintillations in both inner and outer detectors. Thus, while the ray detected by inner detector 36 may have the proper energy when it causes the scintillation in 36, the fact that a coincident scintillation was caused in the outer detector 20 results in its rejection, since it was either of the wrong energy or came from a direction which was considered improper. Thus, there will be the proper magnitude pulse to gate 117 from 52 and 54 but the logic condition $\overline{A}BC$ for gate 116 will not be fulfilled. Therefore, no signal will be passed from gate 116 to gate 117 and no output will be generated by gate 117.

In this manner the background is discriminated against and only rays of the preselected energy, arriving from the particular predetermined direction will result in an indication through energization of the appropriate integrator 70 or 72.

Figure 16:
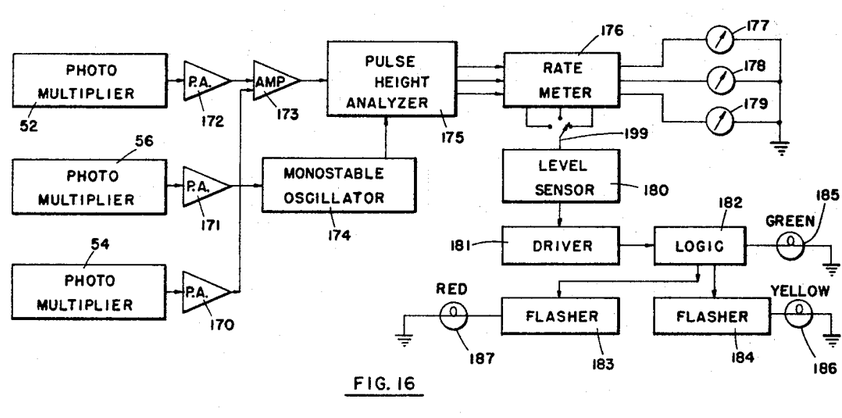
FIG. 16 is a schematic diagram of a third embodiment of the present invention.

A third embodiment of the present invention utilizing miniaturized electronic subsystems is shown in FIG. 16. Similarly to the embodiments of FIG. 12, the output signals from all three photomultipliers 52, 54, and 56 are amplified by low noise preamplifiers 170, 171, and 172 and then, in the case of pulses from the two signal preamplifiers 170 and 172, amplified still further by a linear amplifier 173. Pulses appearing at the output stage of the anticoincidence preamplifier 171, on the other hand, are used to trigger a monostable oscillator 174. Pulses from both the linear amplifier 173 and the monostable oscillator 174 are then passed to the pulse height analyzer 175 which functions as a gate and passes a pulse only if the signal pulse has the proper energy to pass through one of the electronic channels and if there is no simultaneous pulse arriving from the monostable oscillator 174. Although a plurality of channels of pulse height analysis capability may be utilized in this embodiment, only three are described here. Pulses passing through these three channels are processed by a three-channel ratemeter 176 and the outputs displayed on small microammeters 177–179. Also shown in FIG. 16 is a visual signal display which is dependent upon a preset output level from ratemeter 176. When a specific threshold is reached, the level sensor 180 would initiate pulses which are analyzed by a logic network consisting of driver 181, logic circuit 182 and flashers 183 and 184 to determine which of the three possible indicator lights 185, 186, and 187 should be activated. The green light 185 is activated during almost all periods when a target is not in the field of view. If a target is in range and within the field of view, the flashing red light 87 is activated.

Figure 17:
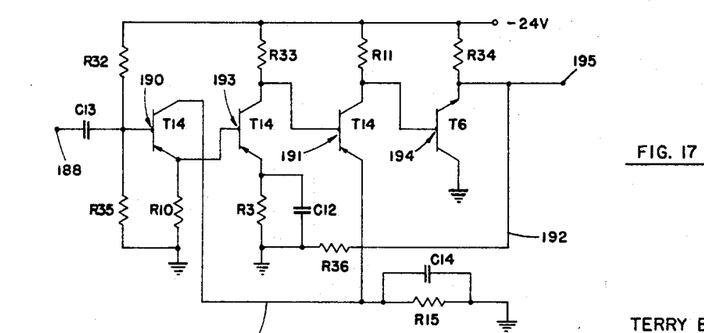
FIG. 17 is a circuit diagram of the preamplifier used in the embodiment of FIG. 16.

The preamplifier circuit used with all three photomultipliers and shown in FIG. 17, has inputs at 188 and is a relatively conventional direct-coupled unit employing D.C. feedback 189 between the first and third transistor stages 190 and 191, respectively, to improve transistor operating point stability, and negative feedback 192 between the second 193 and fourth 194 transistor stages to improve linearity, stability, and frequency response. The outputs 195 of preamplifiers 170 and 172 are connected to the inputs 196 and 197 of amplifier 173, shown in FIG. 18, while the output 195 of preamplifier 171 is connected to input 198 of monostable oscillator 174 shown in FIG. 19.

Figure 18:
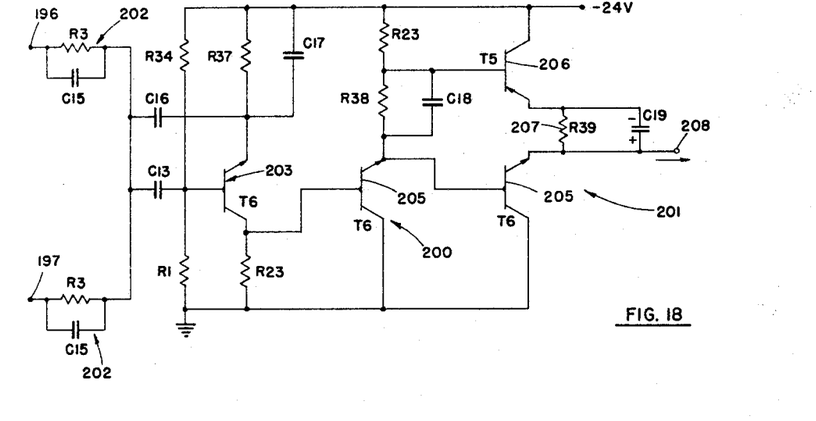
FIG. 18 is a circuit diagram of the amplifier used in the embodiment of FIG. 16.

As shown in FIG. 18, the amplifier 173 consists of two subsystems, a linear addition circuit 200 and a final amplifier circuit 201. In the linear addition circuit 200 pulses from both signal preamplifiers 170 and 172 at inputs 196 and 197 are passed through identical R-C networks 202 and are superimposed upon the base of the same transistor 203. Since electronic noise pulses may be expected to occur randomly in the two signal channels while a true scintillation pulse will be seen by both photomultipliers 52 and 54, and presented to the base of transistor 203 simultaneously, the average pulse height of the true scintillations can now be expected to be almost twice their original height while noise pulses will tend to maintain their original level. This, in turn, results in a sharply increased system signal-to-noise ratio since the pulse height analyzers which follow the amplifier stage, as described hereinafter, can now differentiate more readily between the signal and noise pulses. Because of its purely analog nature, the linear addition circuit 200 is used to eliminate the necessity for converting or shaping the signal and then applying it to a digital coincidence gate. While not as effective as the digital technique described above, the use of the analog addition circuitry in this embodiment simplifies the circuitry.

Once the pulses have passed through the addition circuit 200, they are further amplified by transistor 204 and then by a complementary amplifier pair of transistors 205 and 206. The emitters of transistors 205 and 206 may be coupled directly, however, a resistor 207 is inserted to provide improved thermal stability for the configuration. The pulses at output 208, connected to input 209 of height analyzer 175, are several volts high and consist of a positive rectangular pulse approximately one microsecond wide followed immediately by an identical negative pulse.

Figure 19:
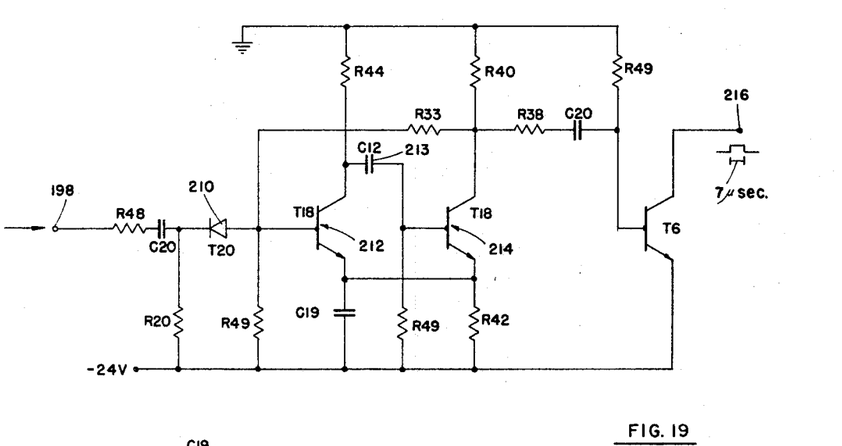
FIG. 19 is a circuit diagram of the monostable oscillator circuit used in the embodiment of FIG. 16.

The output from the anticoincidence preamplifier 171 is capacitively coupled to the input 198 of the monostable oscillator circuit 174 as shown in FIG. 19. After passing through a small diode 210 to "clean up" the preamplifier pulses, these pulses are used to turn off transistor 212, causing the voltage on its collector to drop toward the −24 volts of the power supply. This drop then charges capacitor 213 between transistor 212 and transistor 214, turning transistor 214 on. This condition is maintained until the charge on the capacitor 213 is dissipated, at which time transistor 214 reverts to the "off" condition, turning on transistor 212 and returning the oscillator to its original condition. In this system this process took approximately 7 microseconds, several times longer than the output pulse from the amplifier.

Figure 20:
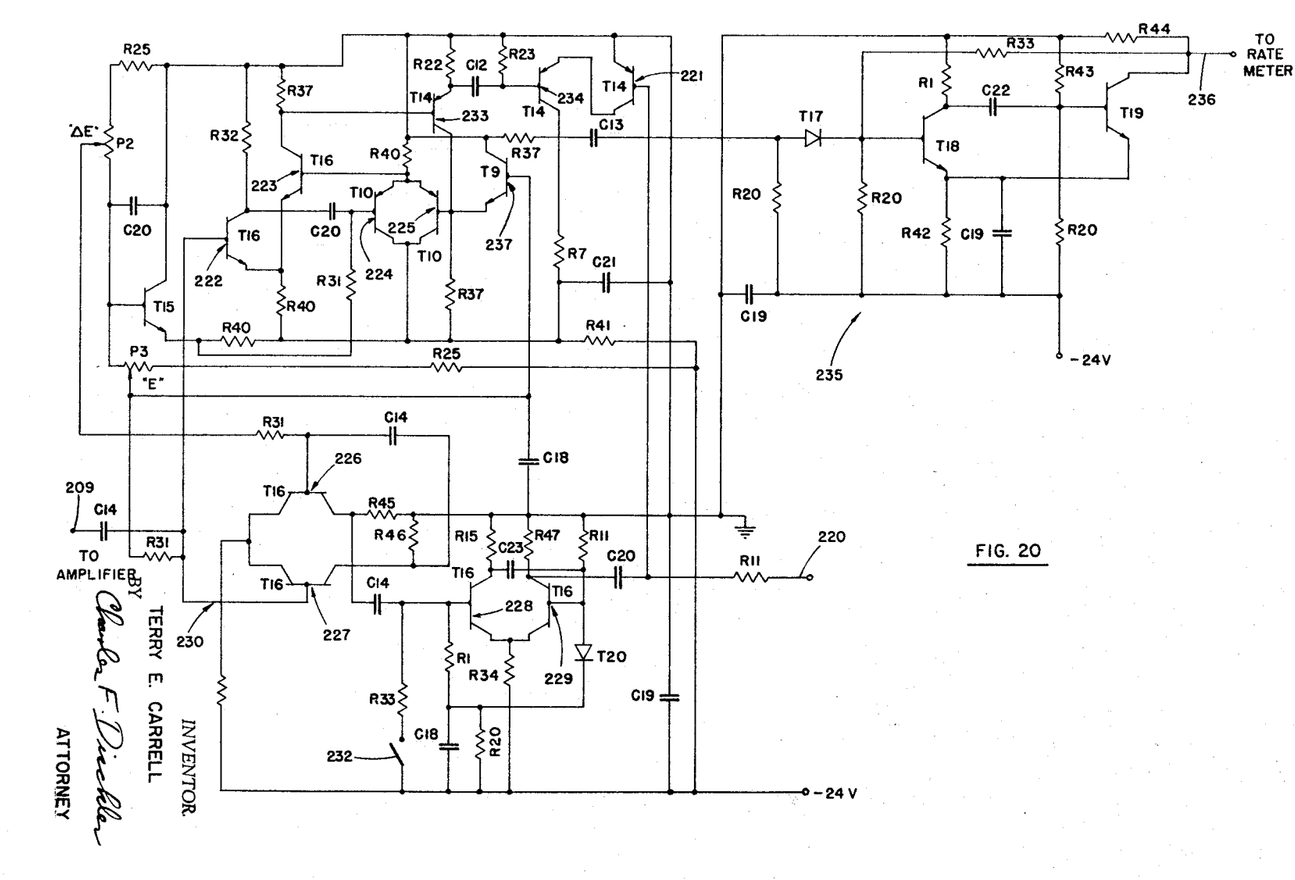
FIG. 20 is a circuit diagram of a typical pulse height analyzer channel used in the embodiment of FIG. 16.

The pulse output at 216 of the oscillator circuit is connected to input 220 of the pulse height analyzer 175 (see FIG. 20) through the transistor gate 221. Aside from this feature, operation of the analyzer 175 is essentially conventional. The upper and lower level discriminators, each consisting of four transistors 222–225 and 226–229, respectively, and their associated circuitry, determine the height of an incoming pulse by determining the capability of the pulse to trigger the two flip-flops with various degrees of bias on them. To illustrate this, suppose that the lower discriminator 230 has a bias on it such that it requires a pulse height of E to trigger it and that the upper discriminator 231 has a different bias such that a pulse height of $E+\Delta E$ is required. If the outputs of these two discriminators are run in anticoincidence, occurring if the switch 232 is left open, a signal will be generated only when the pulse height is between E and $E+\Delta E$. By varying the biases on these discriminators and by using this anticoincidence technique, the height of an incoming pulse can be determined to within a factor of $\Delta E$. Since $\Delta E$ can, in practice, be made virtually equal to zero, the pulse height can be determined quite accurately. In the circuit shown in FIG. 20, the anticoincidence circuit consists of three transistor stages 233, 234, and 237 which give an output only when the lower discriminator 230 has been triggered, the upper discriminator 231 has not, and no blocking pulse has been received from the monostable oscillator at 220. If these conditions are met, the monostable oscillator 235, shown in the upper right corner of FIG. 20, is triggered, producing a one millisecond wide square wave at output 236 which can be readily processed by the ratemeters 176. Thus, the input at 220 and the pulse from 228 and 229 of the Schmitt trigger are used to control the gate 221.

The ratemeters 176 for channels 1 and 3 from photomultipliers 52 and 54 (see FIG. 21) consist of a pulse amplifier stage 240 to amplify the pulse height analyzer output connected to input 241, a rectifier stage 242 to convert the pulses to pulsating D.C. signals, an average background suppression stage 243 consisting of a 3 volt source and a potentiometer 244 to enable the operator to "bias out" the average background noise level, and a 0–50 µa. meter 245 to display the difference between the current driven through the meter by the rectifier stage 242 and that driven through the meter by the background suppression stage 243. Since the current passing through the microammeter 245 if the background suppression stage 243 were not present would consist of an A.C. component and a D.C. component, it is possible to greatly increase the average signal-to-noise level of the system by driving direct current through the meter in the direction opposite to that supplied by the rectifier stage 242 and making the magnitude of this current flow equal to the magnitude of the D.C. level of the current supplied by the rectifiers. The circuit shown in FIG. 21 achieves the average background suppression in exactly this manner. Pulses emitted by the pulse height analyzer are amplified by 240, rectified by 242, filtered by capacitor 246, and supplied to the meter 245 as pulsating D.C. Rapid oscillations of the meter in response to these pulsations are controlled by capacitor 247 to enable the meter to be easily read. The 3-volt source on the other hand supplies current of an opposite polarity and having a magnitude adjustable by potentiometer 244 to the meter to enable the operator to bias out the D.C. level of the background counting rate and display only the A.C. component. The counting rate of this meter is adjustable over a reasonably wide range by the choice of a suitable coupling capacitor 248 between the amplifier and rectifier stages.

Figure 21:
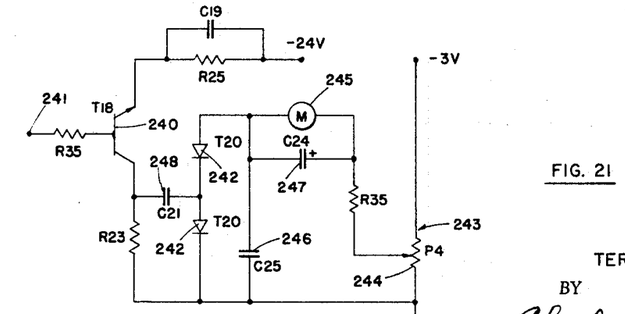
FIG. 21 is a circuit diagram of the ratemeter used for channels 1 and 3 in the embodiment of FIG. 16.
Figure 22:
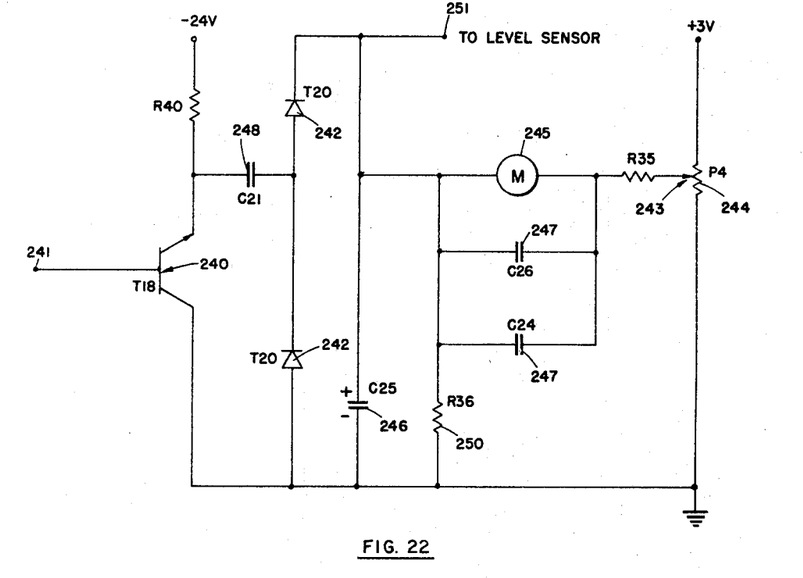
FIG. 22 is a circuit diagram of the ratemeter used for channel 2 in the embodiment of FIG. 16.

The ratemeter used in channel 2 from photomultiplier 56 (see FIG. 22) is identical to that of FIG. 21 except that the current polarities have been reversed, the meter damping capacitance 247 has been increased, a resistor 250 has been added between the positive terminal of the meter 245 and ground, and the voltage impressed across resistor 250 is transmitted to output 251.

Figure 23:
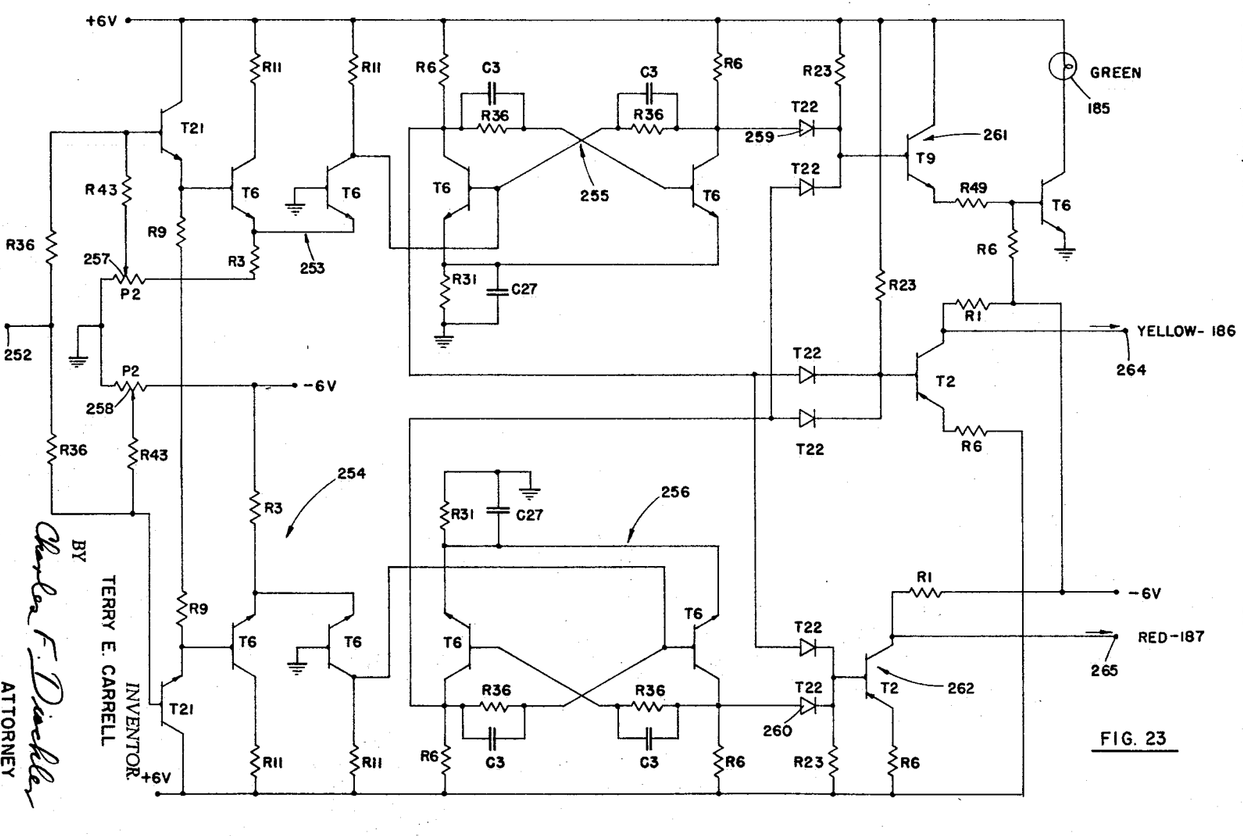
FIG. 23 is a circuit diagram of the ratemeter level sensor and logic circuit used in the embodiment of FIG. 16.

The output 251 is connected to the input 252 of level sensor 180 (see FIG. 23) which consists of two parallel D.C. amplifier stages 253 and 254 followed by two identical flip-flops 255 and 256. Since the gain of the D.C. amplifier stages 253 and 254 is controlled by the potentiometers 257 and 258, the trigger levels of the flip-flops 255 and 256 following the amplifiers are also adjusted by them. The gain of the upper D.C. amplifier 253 is usually set somewhat higher than that of the lower one, causing the upper flip-flop 255 to give outputs at ratemeter counting rates which are too low to trigger the lower circuit. The outputs from these flip-flops 255 and 256 are then fed to a diode logic gate 259 and 260 and associated amplifiers 261 and 262 in such a way that if the ratemeter counting rate is too low to trigger either flip-flop 255 or 256 a green light 185 remains lit. If the upper flip-flop 255 is triggered, however, a signal is passed to the yellow light flasher through output 264 while if both flip-flop 255 and 256 are triggered the signal goes to the red light flasher through output 265.

Figure 24:
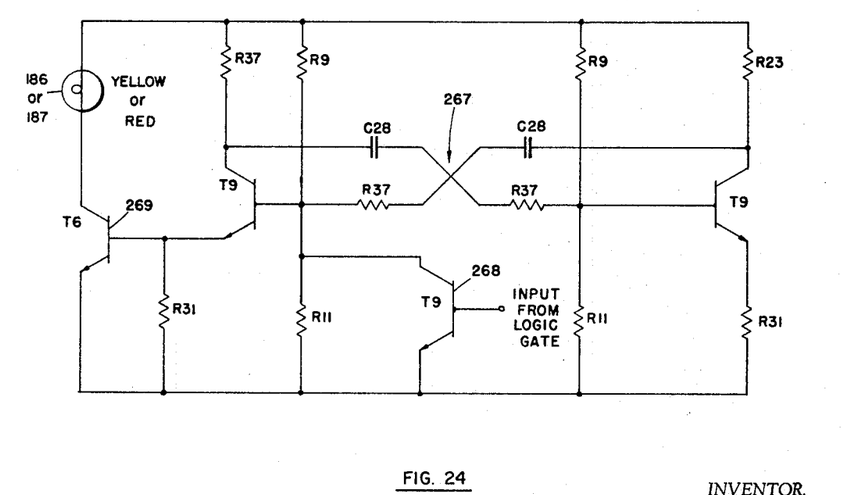
FIG. 24 is a circuit diagram of the flasher circuit used in the embodiment of FIG. 16.

The flasher circuitry used for both the red and yellow lights is identical and is shown in FIG. 24. Basically, it consists of a multivibrator 267 controlled by an input stage transistor 268 and whose output is sensed by a current amplifier stage 269. The flashing rate of this unit is primarily determined by the choice of R-C time constants in the collector-base loop between the two flip-flop transistors. In the circuit shown in FIG. 24 the flashing rate is approximately 90 flashes per minute when transistor 268 is in the "on" condition. When it is "off" the circuit becomes stable and oscillation ceases, extinguishing the flashing red 187 or yellow 186 lights.

As noted above, three channels are utilized in the pulse height analyzer and the ratemeter. Switch 199 is provided so that any one of these channels, of which there may be any desired number, may be selectively connected to the level sensor 180. Although the embodiment of FIG. 16 does not incorporate some of the more sophisticated features used in the other embodiments described (e.g., double delay line pulse shaping amplifiers), other of the electronic subsystems are even more refined (e.g., the average background noise level suppression) resulting in a system which, although considerably more compact, possesses essentially all of the performance characteristics of the previous embodiments which are larger.

Figure 16A:
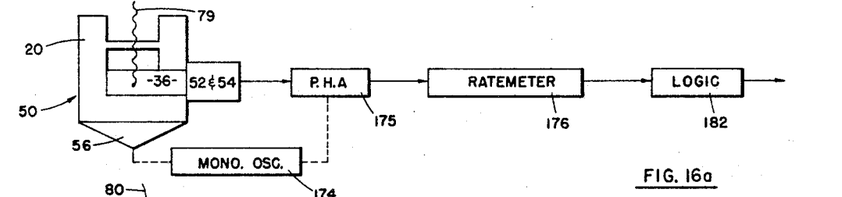
FIGS. 16A through 16F show schematically the operation of the embodiment of FIG. 16 in response to various radiations.
Figure 16B:
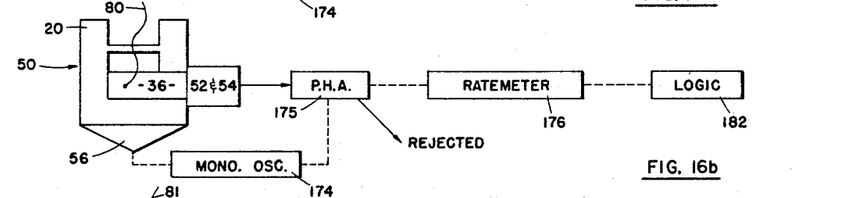
Figure 16C:
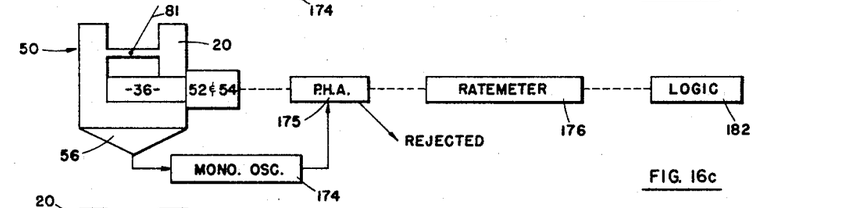
Figure 16D:
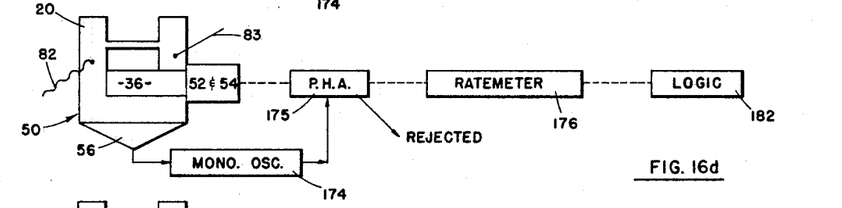

FIGS. 16A through 16F show the operation of the embodiment of FIG. 16 in response to various radiations 79 through 85 having the directions and energies described above. In FIG. 16A the radiation 79 from the proper direction and of the proper energy does not energize monostable oscillator 174, but being of the correct energy does energize pulse height analyzer 175, ratemeter 176 and the remainder of the system as depicted by logic 182. Where the radiation 80 is from the proper direction, i.e., monostable oscillator 174 is not energized, but is of the wrong energy, the pulse height analyzer 175 rejects the signal and rate meter 176 and the remaining system is not energized, as shown in FIG. 16B.

Where the radiation is either of the wrong type, of insufficient energy, or from the wrong direction to cause a detectable event in the inner scintillator 36, as is the case for radiations 81, 82, and 83 (see FIGS. 16C and D), no signal is generated by photomultipliers 52 and 54. Monostable oscillator 174 is energized in these instances but the pulse height analyzer 175 does not generate an output signal since there has been no input from 52 and 54.

Figure 16E:
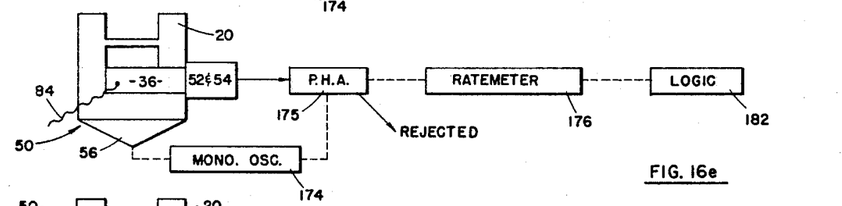
Figure 16F:
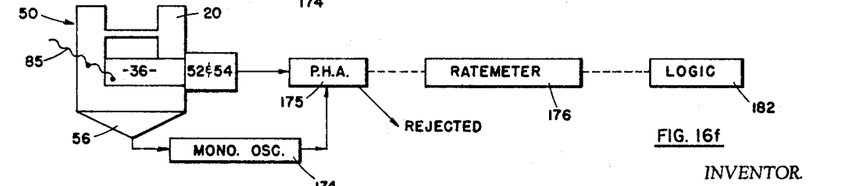

FIG. 16E shows a situation where the gamme ray to be detected, 84, is of sufficient energy to pass through the outer detector 20 without causing a detectable event and is detected by the inner detector 36. While this fulfills the conditions that the monostable oscillator not generate an output to pulse height analyzer 175, the pulse height analyzer will reject the event on the basis that in order for a gamma ray to penetrate the outer detector 20 without causing an event the ray almost necessarily has an energy greater than the range of energy selected. FIG. 16F shows the situation where the incoming radiation 85 causes events in both detectors 20 and 36. This event is also rejected by the pulse height analyzer, 175, since the analyzer receives inputs from both the photomultipliers associated with the inner detector 36 and from the monostable oscillator. In such situations the analyzer does not generate an output signal. Thus, it is only when the radiation is from the proper direction and within the preselected energy range that the event is recorded by the logic system, and in this embodiment the pulse height analyzer functions also as a gating means which is unresponsive to the signal representing an event in the inner detector 36 if a signal is also generated by oscillator 174.

The exact values of the various components of the circuits shown in the drawings are listed in Table I.

TABLE I

Resistors

| | | | |
|---|---|---|---|
| R1 | 10K | R22 | 680Ω |
| R2 | 2.2K | R23 | 5.6K |
| R3 | 12K | R24 | 5K (var.) |
| R4 | 2M | R25 | 470Ω |
| R5 | 220K | R28 | 1.8K |
| R6 | 4.7K | R29 | 50K (var.) |
| R7 | 22K | R30 | 47K |
| R8 | .15K | R31 | 1K |
| R9 | 100K | R32 | 390K |
| R10 | 33K | R33 | 39K |
| R11 | 15K | R34 | 3.9K |
| R12 | 1.25K | R35 | 68K |
| R13 | 2K | R36 | 56K |
| R14 | 1.5K | R37 | 3.3K |
| R15 | 2.7K | R38 | 820Ω |
| R16 | 20K (var.) | R39 | 68Ω |
| R17 | 1K (var.) | R40 | 6.8K |
| R18 | .39K | R41 | 100Ω |
| R19 | .47K | R42 | 180Ω |
| R20 | 27K | R43 | 82K |
| R21 | 13K | R44 | 8.2K |
| R45 | 1.2K | R48 | 120Ω |
| R46 | 390Ω | R49 | 18K |
| R47 | 270Ω | | |

Potentiometers

| | |
|---|---|
| P1 | 100K pot. |
| P2 | 25K pot. |
| P3 | 500Ω |
| P4 | 2.5K |

Capacitors

| | | | |
|---|---|---|---|
| C1 | 30 μf | C15 | 47 pf |
| C2 | 500 μf | C16 | 33 pf |
| C3 | 500 pf | C17 | .002 μf |
| C4 | 3–30 pf | C18 | .05 μf |
| C5 | .082 μf | C19 | 4.7 μf |
| C6 | .02 μf | C20 | .1 μf |
| C7 | 3 μf | C21 | 2.2 μf |
| C8 | 25 μf | C22 | .047 μf |
| C9 | 680 pf | C23 | 470 pf |
| C10 | 100 pf | C24 | 100 μf |
| C11 | .0018 pf | C25 | 20 μf |
| C12 | 220 pf | C26 | 60 μf |
| C13 | .001 μf | C27 | .0022 μf |
| C14 | .01 μf | C28 | 10 μf |

Transistors and diodes

| | | | |
|---|---|---|---|
| T1 | 10VZ | T12 | FD100 |
| T2 | 2N1377 | T13 | 2N2331 |
| T3 | 1N627 | T14 | 2N537 |
| T4 | 2N859 | T15 | 2N1304 |
| T5 | 2N1132 | T16 | 2N167 |
| T6 | 2N697 | T17 | 1N54 |
| T7 | 1N34 | T18 | 2N338 |
| T8 | 2N706 | T19 | 2N335A |
| T9 | 2N1308 | T20 | H3050 |
| T10 | 2N1309 | T21 | 2N336 |
| T11 | SV1340 | T22 | HD4636 |

The values listed are for the purpose of illustration only and may be varied in both their absolute and relative values in accordance with teachings well known in the art. Further, the subject invention may utilize other subsystems than those specifically depicted, e.g., other well known preamplifiers, amplifiers, gates, coincident circuits, pulse height analyzers, etc., as is well known in the art. These and other modifications, substitutions and changes will be apparent to those skilled in the art. Therefore, the scope of the present invention is not limited by the specific embodiments described but only by the following claims.

I claim:
1. An unshielded gamma radiation sensor comprising a first scintillation element responsive to gamma rays, a second scintillation element optically decoupled from the first element and responsive to gamma rays, said first element partially surrounding and protecting said second element from radiation other than gamma type radiation and defining a single field of view for said second element, a filter element positioned in spaced relation to said second element and across said field of view for absorbing continuously ionizing radiation directed into said field of view.

2. The radiation sensor of claim 1 wherein said filter includes a scintillation element positioned across said field of view which is relatively non-responsive to gamma rays.

3. A radiation detection system including an unshielded radiation sensor responsive to gamma rays having first and second scintillation means optically decoupled from each other, said second means being protected from radiation other than gamma type radiation by said first means, means for electronically discriminating between gamma radiation impinging upon said first and second means which is within a preselected range and gamma radiation outside said range, said discriminating means having a first photomultiplier means for generating a signal in response to the detection of a radiation event in said first scintillation means and a second photomultiplier means for generating a signal in response to the detection of a gamma radiation event in said second scintillation means, said second photomultiplier means including a pair of photomultipliers responsive to scintillations in said second scintillation means and having their outputs connected to a noise suppressing means, said noise suppressing means including a coincidence circuit generating an output signal only upon the coincident detection of said pair of photomultipliers of a scintillation in said second scintillation means.

4. The radiation detector system of claim 3 wherein said first photomultiplier means and said output signal of said coincidence circuit are connected to a gate means, said gate means generating an output signal only when said coincidence output signal is present and no radiation event has been detected by said first photomultiplier means in said first scintillation means.

5. A radiation detection system including an unshielded radiation sensor responsive to gamma rays having first and second scintillation means optically decoupled from each other, said second means being protected from radiation other than gamma type radiation by said first means, means for electronically discriminating between gamma radiation impinging upon said first and second means which is within a preselected energy range and gamma radiation outside said range, said discriminating means having scintillation detecting means including a first photomultiplier means for generating a signal in response to the detection of a radiation event in said first means and a second photomultiplier means for generating a signal in response to the detection of a gamma radiation event in said second means, said second photomultiplier means including a pair of photomultipliers responsive to scintillations in said second means to generate an output pulse, said pair being connected in parallel and said output pulse being connected to a summing means, said summing means generating an output of increased amplitude only upon the simultaneous detection of a gamma radiation event in said second element of said pair of photomultipliers, said output of increased amplitude representing said radiation event.

6. A radiation detection system including an unshielded radiation sensor responsive to gamma rays having first and second scintillation means optically decoupled from each other, said second means being protected from radiation other than gamma type radiation by said first means, means for electronically discriminating between gamma radiation impinging upon said first and second means which is within a preselected energy range and gamma radiation outside said range, said discriminating means having first photomultiplier means including a pair of photomultiplier tubes for generating a signal in response to the detection of a radiation event in said first scintillation means, and second photomultiplier means for generating a signal in response to the detection of a gamma radiation event in said second scintillation means, digital gate means responsive to both said first and second photomultiplier means for generating an output signal only when said pair of photomultiplier tubes of said first photomultiplier means simultaneously respond to a scintillation and said second photomultiplier means fails to generate a signal, linear gate means responsive to the signals on said pair of photomultiplier tubes and the simultaneous presence of an output signal from said digital gate to pass said signal from said pair of photomultiplier tubes, and means responsive to said linear gate signal for detecting and counting the number of signals during a preselected time period which represent gamma rays within a preselected energy range.

7. A radiation detector system including an unshielded radiation sensor responsive to gamma rays having first and second scintillation means optically decoupled from each other, said second means being protected from radiation other than gamma type radiation by said first means, first photomultiplier means responsive to a radiation event in said first means for generating a first signal, second photomultiplier means responsive to a gamma radiation event in said second means for generating a second signal, pulse generating means responsive to said first signal for generating an output, means responsive to said second signals and the simultaneous absence of said pulse generator output for discriminating between second signals representing gamma radiation having an energy within a predetermined energy range and gamma radiation outside said range and for generating an output signal for each of said second signals representing a gamma ray having an energy within said predetermined range which causes a radiation event only in said second scintillation means.

8. The radiation detector system of claim 7 wherein said second photomultiplier means includes a pair of photomultiplier tubes each responsive only to radiation events in said second means and means for summing the outputs of said pair of tubes to suppress noise, said discriminating means being responsive to said summed output.

9. The radiation detector system of claim 7 including rate meter means for counting as a function of time the number of said last named output signals.

10. The radiation detector system of claim 9 including comparator means responsive to the number of pulses in a preselected range counted by said rate meter means for selectively energizing at least one of a plurality of alarms.

11. The radiation detector system of claim 9 including comparator means responsive to said rate meter means for selectively comparing the number of pulses per unit time with at least one preselected level and for energizing one of a plurality of alarms when said number exceeds said preselected level.

References Cited

UNITED STATES PATENTS

| | | | |
|---|---|---|---|
| 2,830,189 | 4/1958 | Scherbatskoy | 250—71.5 |
| 2,881,324 | 4/1959 | Scherbatskoy | 250—71.5 |
| 3,209,153 | 9/1965 | Frenk | 250—207 |
| 3,246,150 | 4/1966 | Stoddart et al. | 250—71.5 |
| 3,233,103 | 1/1966 | Aoki | 250—83.1 X |

RALPH G. NILSON, *Primary Examiner.*

A. B. CROFT, *Assistant Examiner.*